United States Patent [19]
Bizzini et al.

[11] 3,717,551
[45] Feb. 20, 1973

[54] METHOD OF CELL CULTURE

[76] Inventors: Bernard Bizzini, 18, rue Ernest Delosion, Neuilly; Jean-Claude Chermann, 14 rue du Prieure Saint-Nicolas, Villepreux; Claude Jasmin, 10, rue Mesnil, Paris; Marcel Raynaud, 115, boulevard de la Reine, Versailles, all of France

[22] Filed: July 2, 1970

[21] Appl. No.: 52,062

[30] Foreign Application Priority Data

July 9, 1969 France.................................6923294

[52] U.S. Cl.......................................195/1.7, 195/1.1
[51] Int. Cl. ................................................C12k 9/00
[58] Field of Search ..........424/89; 195/1.1, 1.7, 1.8; 167/78, 79

[56] References Cited
UNITED STATES PATENTS

3,493,651    2/1970    Sloane....................................424/89

OTHER PUBLICATIONS

Willmer, Cells and Tissues in Culture; Methods, Biology and Phsiology, Vol. 1, published by Academic Press, New York, 1965, page 40.

*Primary Examiner*—Richard L. Huff
*Attorney*—Craig, Antonelli & Hill

[57]    ABSTRACT

A method for the culture of cells of the type which grow in films and substantially in monolayers, the method being intended to be employed for virus production, the cells to be cultivated being fixed on porous silica spherules which are maintained in suspension in the culture medium.

2 Claims, No Drawings

METHOD OF CELL CULTURE

This invention relates to a method for the culture of cells of the type which grow in films and substantially in monolayers, this method being intended to be employed for virus production.

The culture of cells in monolayer films is well known and has permitted very rapid development of virological techniques and the manufacture of anti-viral vaccines from viruses produced in vitro under reproducible and readily controllable conditions.

However, culture in stationary bottles or flasks permits the use of only a small surface area relative to the volume of the flasks and to the quantity of culture medium which is employed. In a non-agitated flask, the cells develop in a monolayer film on the bottom of the flask.

It has been possible to achieve an improvement by carrying out the culture of cells in cylindrical tubes carried by a wheel which is driven in slow motion. By means of this method, the culture medium is agitated continuously and the cells develop over the entire surface of the tube, thereby permitting maximum utilization of the culture medium. In order to increase the surface area afforded for the multiplication of cells to an even greater extent, it has been proposed more recently to make use of particles of certain organic polymers which are maintained in suspension in a culture medium by moderate agitation. Thus, Van Wezel has employed spherical particles of DEAE Sephadex A 50 which are maintained in suspension in a culture medium.

However, the last-mentioned technique carries disadvantages by reason of the toxicity of some of the particles employed (Sephadex is toxic above a limiting concentration of 1 to 2 g/l), thereby entailing the need to cover the particles with collodion prior to use. Moreover, the cells adhere very strongly to the surface of the particles and it proves very difficult to detach them. Treatment with trypsin permits the recovery of scarcely more than 20 percent of the cells, the majority of which remains attached to the particles of Sephadex.

Sephadex, which is made up of polyglucoses (dextran gel), cannot readily withstand temperatures which are higher than 110° C without incurring the danger of decomposition and this impedes sterilization.

The method of cell culture as contemplated by the invention overcomes the different disadvantages referred-to in the foregoing.

In accordance with this method, the cells to be cultivated are fixed on porous mineral particles which are maintained in suspension in a culture medium.

In general, the most suitable porous mineral particles are spherical particles having shapes which facilitate recovery of cells and which have the effect as far as possible of preventing losses of material arising from even moderate agitation.

It is readily apparent that the nutrient media which are employed in biological cultures are aqueous solutions and that the porous mineral particles employed must consequently be insoluble therein and must in addition be inactive with respect to the useful products which are dissolved in said nutrient media.

In accordance with the invention, use is advantageously made of porous silica spherules which are available industrially and can have widely different textural and structural properties. The spherules are known by the trade name "Spherosil" and exist in a series of forms which differ from each other in their porosity. The size range of these spherules is between 125 and 150 microns. The different types which are suitable for use are characterized by the mean pore diameter.

| Type | Mean pore diameter |
| --- | --- |
| XOA.400 | 100 A |
| XOA.200 | 125 – 150 A |
| XOB.075 | 320 A |
| XOB.030 | 760 A |
| XOB.015 | 1,350 A |

The quantity of silica spherules employed is usually within the range of 1 to 10 g per liter of culture medium.

Surprisingly, it has been observed that, after inoculation of the nutrient medium with suitable strains, the cell cultures develop while progressively covering the surfaces of the silica spherules and while even forming bridges between some of these latter. The cells can readily be recovered after settling by stopping the agitation and by rapid trypsinization.

The underlying reason for the advantages arising from the use of porous silica spherules in cell cultures is incompletely understood. However, it is considered that the porosity of the spherules acts favorably not only in order to reduce the density of said spherules but also by facilitating the exchanges of solutions since it has been found that glass spherules are not capable of producing equally satisfactory results.

One example of cell culture on porous silica spherules will now be described without any limitation being implied and solely in order to provide an explanatory illustration of the invention.

EXAMPLE

The strict minimum of EAGLE is employed as culture medium, to which a proportion of 10 percent of decomplementized calf serum is added for a period of 30 minutes at 56° C, and which contains per milliliter 50 units of penicillin and 50 units of kanamycin. The pH of this medium is adjusted to 7 by means of 55 g/l sodium bicarbonate solution. This medium is placed in a proportion of 500 ml per flask in a number of flasks each having a capacity of 100 ml and each provided with two lateral openings for withdrawing or adding liquid and a central plug in which is held a wire for gripping a magnetic rod. Said flasks are placed in an oven with a variable-speed stirrer, the temperature of said oven being maintained at 37° C. There were added in each flask 2 g of silica spherules having a particle diameter between 125 and 150 microns and a mean pore diameter of slightly less than 100 A. Said spherules were previously washed in the hot state with 6 N hydrochloric acid and then with distilled water, then in a detergent and finally rinsed with distilled water, then double-distilled. Sterilization of said spherules was carried out in a dry-heat oven at a temperature of 180° C for a period of one hour.

Inoculation is carried out with approximately $10^5$ cells per milliliter of nutrient medium which are taken from cultures prepared from mouse thymus and infected with the Rauscher murine leukemia virus.

Growth is studied by sampling silica spherules in suspension after 24, 48 and 72 hours. After 24 hours, the cells are attached to the spherules but do not cover the entire spherule surface; after 48 hours, then after 72 hours, the entire spherule surface is covered, whereupon the spherules are grouped into masses and joined together by colonies of cells which form bridges. A mass of spherules which floats freely in the culture medium is sometimes suspended from a cell which is attached to a spherule.

The recovery of cells is carried out after 72 hours by rapid trypsinization after settling of the cells. Viability of the cells thus obtained as determined by counting after staining with trypan blue is close to 100 percent, their number being approximately $4 \times 10^5$ per milliliter of culture medium.

It will be understood that, in industrial practice, the culture of cells on silica spherules can be carried out in accordance with a number of different processes, whether non-continuous, semi-continuous or wholly continuous.

This method is applicable to the culture of standard cell strains of human origin and more generally to the culture of all types of cells which grow in films. It is particularly well suited to mass cell production which require a substrate for multiplication and to the obtainment of large quantities of viruses in a minimum spatial volume. The method is of considerable interest in the manufacture of anti-viral vaccines from viruses produced in vitro.

What we claim is:

1. A method of culture of cells intended for virus production and of the type which grow in a monolayer film, wherein the cells to be cultivated are fixed on porous silica spherules, having diameters of about 125 microns, which are maintained in suspension in the culture medium, the mean diameter of the pores of said spherules being within the 100 - 1350 A-range.

2. In a method for culture of cells intended for virus production and of the type which grow in a monolayer film, the improvement comprising fixing the cells to be cultivated on porous silica spherules, which are maintained in suspension in the culture medium, said spherules having diameters from about 125 to about 150 microns and mean pore diameters between 100 and 1350 A.

* * * * *